United States Patent [19]
Gott

[11] 4,013,562
[45] Mar. 22, 1977

[54] PORTABLE WATER FILTER

[76] Inventor: Willie Gray Gott, 11311 Renee Ave., The Foothills, Yuma, Ariz. 85364

[22] Filed: Nov. 3, 1975

[21] Appl. No.: 628,579

[52] U.S. Cl. .............................. 210/232; 210/244; 210/282

[51] Int. Cl.$^2$ ................. B01D 39/04; B01D 35/02

[58] Field of Search .......... 210/232, 236, 237, 238, 210/241, 244, 240, 282, 443, 444; 55/357, 422

[56] References Cited

UNITED STATES PATENTS

| | | | |
|---|---|---|---|
| 2,260,920 | 10/1941 | Shenk | 210/238 |
| 2,561,507 | 7/1951 | Gordon | 210/238 |
| 3,585,130 | 6/1971 | Gregory | 210/282 |
| 3,780,867 | 12/1973 | Zirlis | 210/266 |

*Primary Examiner*—Frank W. Lutter
*Assistant Examiner*—David L. Lacey
*Attorney, Agent, or Firm*—Frank D. Gilliam

[57] ABSTRACT

A portable water filter for recreation vehicles and the like. The filter comprising a canister with an inner filter element is mounted on the inner surface of the lid of its storage container. The container comprises a base member and four perpendicular walls attached to the base. The opening of the container is closed with the lid attached thereto with the filter canister positioned within the container. In the filter operable position, the lid is inserted in slots positioned perpendicular to the base on opposite inner wall surfaces. The container now acts as a support member for the operable filter canister. The filter canister is connected through connection conduit in series with the water to be filtered and the recreation vehicle water system. One of the container wall's outer surface has a carrying handle attached thereto. The container with the lid installed includes ample additional space for storing accessories.

8 Claims, 4 Drawing Figures

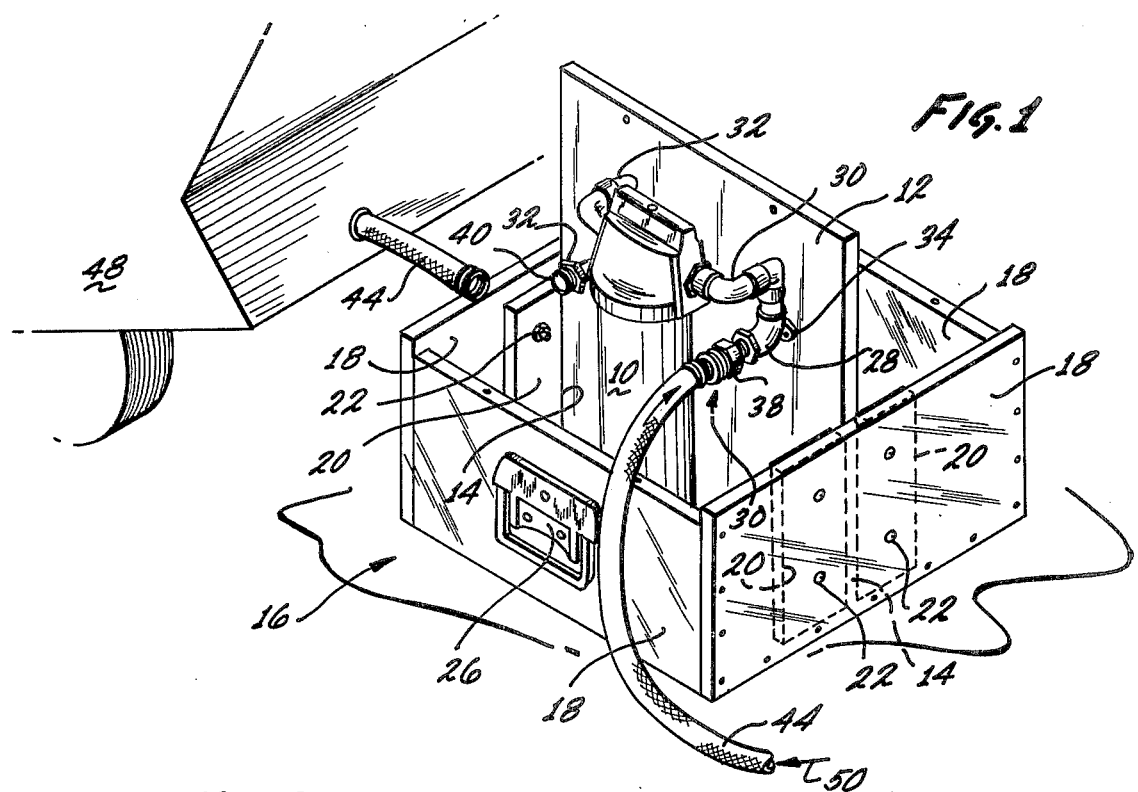
Fig. 1
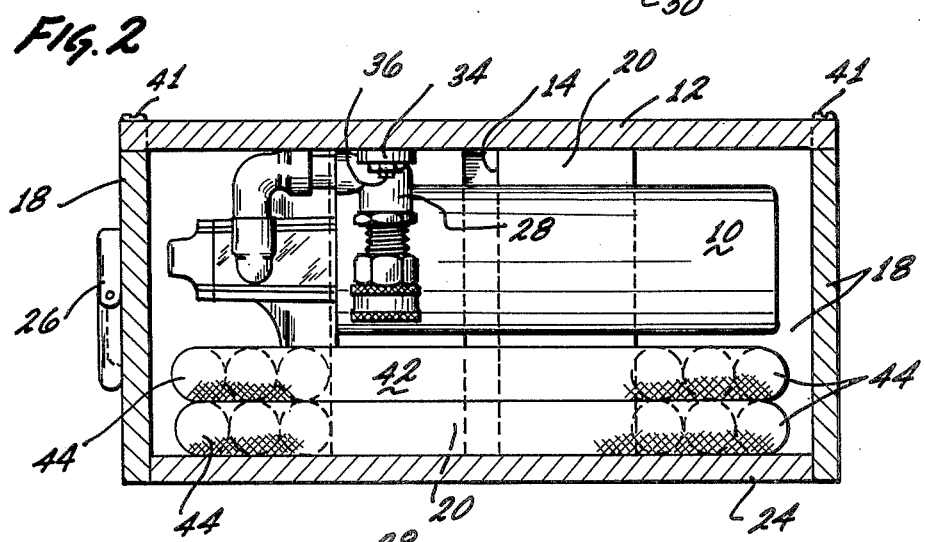
Fig. 2
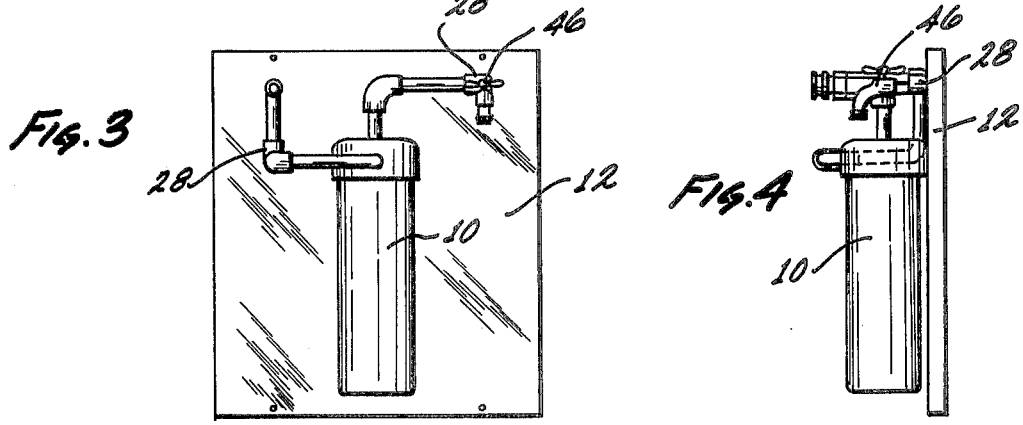
Fig. 3
Fig. 4

PORTABLE WATER FILTER

BACKGROUND OF THE INVENTION

The invention relates to water filters and more specifically to portable water filters for removing dirt, grit, unpleasant tastes and odor from water for use with recreation vehicles.

Presently available portable water filters, such as, described in U.S. No. Pat. No. 1,335,282 are large and incompatable for use with recreation vehicles which have limited storage space.

The water filter taught by U.S. Pat. No. 3,585,130 while operable does not provide ease of filter element replacement, compactness and requires a pressure valve to limit the water pressure to the container to some value less than normally provided by commercial water systems.

Neither of the present art filter apparatus provide for a convenient portable water filter for recreation vehicles and the like.

SUMMARY OF THE INVENTION

In accordance with the invention claimed is a convenient portable water filter and carrying case combination that can be conveniently stored as loose equipment when not in use and quickly installed exterior of the vehicle when its use is required.

It is therefore, one object of this invention to provide a means of filtering potable water from any pressurized water source.

Another object of this invention is to provide a portable water filter of a size small enough to be conveniently stored in a small area of a recreation vehicle when not in use and easily and quickly made operative when required.

Another object is to provide a portable water filter that can be concealed and protected by its carrying case when not in use.

Still another object is to provide a carrying case that not only provides storage for the filter canister but also provides storage for filter attachment accessories.

Further objects and advantages of the invention will become apparent as the following description proceeds and the features of novelty which characterize this invention will be pointed out with particularity in the claims annexed to and forming part of this application.

BRIEF DESCRIPTION OF THE DRAWINGS

The present invention may be more readily described by reference to the accompanying drawings in which:

FIG. 1 is a perspective view of the portable water filter of the invention including its hook-up accessories;

FIG. 2 is a cutaway end view of the FIG. 1 showing with the lid/mounting board installed on the container as a lid;

FIG. 3 is a showing of lid/mounting board with a filter and valve attached;

FIG. 4 is a side view of the FIG. 3 showing.

DESCRIPTION OF THE PREFERRED EMBODIMENTS

Like reference numerals used throughout the description denote the identical element or part.

Referring now more particularly to the drawings, FIG. 1 shows a perspective view of the portable filter unit ready for operation.

The canister 10 containing a filter element of activated charcoal or the like is shown supported by the lid/support member 12 held in place by slots 14, shown on one end of base/container 16 in FIGS. 1 and 2. The slots 14 may be cut or formed (not shown) into the upright walls 18 or provided by a pair of cleats so positioned on each inner opposed wall 18 of container 16 to form the slot. The cleats are spaced apart a distance slightly greater than the width of the lid/support 12 so that the lid/support easily slips within the slots provided. The cleats may be secured to the walls 18 in any suitable manner, not limited to nut and bolt combinations 22 as shown.

Two opposing walls 18 are shorter in height than the other walls by an amount equal to the thickness of lid/support 12. This allows the lid/support 12 to fit flush with the longer side walls as shown in FIG. 2. This feature provides a smooth overall outer profile of the portable filter for storing when not in use.

The container 16 and lid/support 12 may be constructed with such dimensions that the lid/support 12 could fit flush with the upper wall surfaces and still be able to slip into slots as hereinbefore described.

The container base 24 is made and installed in a similar manner as the lid/support member 12. The base 24 unlike lid/support member 12 is permanently attached to the four walls 18 in a conventional manner, such as, but not limited to glue, screws, glue and screws, and the like.

One outside wall surface 18 is provided with a fold up handle 26 suitably constructed to support the weight of the portable filter and its accessories.

The container base, side walls and lid/support may be constructed of any suitable material such as, metal, wood, fibre glass, resin system or the like.

The canister and filter element may be of any commercially available type for removing dirt and rust particles and removing unpleasant tastes and odors from potable water. An example of a suitable canister and filter element would be those made by Cuno, a division of AMF or the canister and filter element described in U.S. Pat. No. 3,780,867 or the equivalent.

The canister 10 containing a filter element is attached to lid/support 12 by a pair of Wing ell fittings 28 positioned on each side of the filter. These Wing ells 28 are attached to the lid/support in a manner so that their respective input and output conduits 30, 32 respectively, can be conveniently attached to and support the canister. It should be noted that the position of the input and output conduits are not limiting and may for some canisters be positioned in the reverse that is shown for canister 10. The Wing ell fittings each have a pair of apertures 34 for mounting the Wing ell to the lid/support member. The Wing ell may be mounted, as shown in FIG. 2, by nut and bolt combinations 36 or any other suitable manner. It should be obvious that the canister and conduits may be attached to the lid/support by any conventional means.

The unattached outer ends of the input and output conduits are provided with either a female or male hose coupling 38, 40 respectfully. In some uses, the input may have a female while the output has a male or the reverse or both may have a male or female depending on the water system input and output hook-up requirements. On a conventional system, the input would have a female coupling and the output a male coupling.

Referring now specifically to FIG. 2, when the canister is in its inoperative or stored position, where the lid/support is installed as a lid and held in place by easily removable screws 41, wingnuts or the like there is provided a storage compartment 42 for storing interconnecting hoses 44 and the like, as well as any other desired accessories not shown.

Some uses for the portable filter require a valve means 46, shown in FIGS. 3 and 4, for shutting off the outflow from the filter element within the canister when no filtered water is required.

OPERATION OF THE PREFERRED EMBODIMENT

When the portable filter is not in use it is stored, as shown in FIG. 2. When operation of the portable water filter is desired the securing screws 41 are removed, the lid is raised and the accessories are removed from the container, the lid is inserted within the slots 14 in its support position, and the screws 41 are replaced in the container for storage.

It should be easily understood that the container 16 provides a base for the support of the canister when the canister is in its operative position as shown in FIG. 1.

The input hose is attached to a pressurized water supply to be filtered, not shown, in a conventional manner. The output hose is installed between the output of the canister and the water supply input of a recreation vehicle 48 or the like. The water supply is then turned on, flowing in the direction of arrow 50 and the supply water will be filtered on demand as water is utilized by operation of the recreation vehicle output water valve, not shown.

In the operation of the portable water filter, when its output is not normally connected, the valve 46 is turned to its off position and filtered water can be drawn on demand by operating the output valve to its on position.

As can be readily understood, the canister or any of its conduit means may be readily replaced or repaired by separating the lid/support from the container so as to provide easy accessability to the components.

Many changes may be made in details of the instant invention, in the method and materials of fabrication, in the configuration and assemblage of the constituent elements, without departing from the spirit and scope of the appended claims, which changes are intended to be embraced therewithin.

Having thus described the invention, what is claimed as new and useful and desired to be secured by United States Letters Patent is:

1. A portable water filter comprising:
   a base member;
   a plurality of vertical side wall members fixedly attached to said base member and perpendicular thereto forming an open ended container therewith;
   holding means positioned along the inner surfaces of two of said vertical side walls;
   a removable cover member covering the open end of said container and providing a support member when secured within said container by said holding means;
   water filter means mounted to the inner surface of said cover member, said filter means being in a stored position when said cover is positioned as a closure for said container and in an operable position when said cover member is positioned as a support member; and
   input and output conduit means for delivering unfiltered water to said filter means and removing filtered water therefrom.

2. The invention as defined in claim 1, wherein, the outer surface of one of said plurality of wall members includes a carrying means attached thereto.

3. The invention as defined in claim 1, wherein, said holding means are vertical slots provided by spaced apart cleat members attached to the inner surfaces of opposing walls of said vertical walls.

4. The invention as defined in claim 1, wherein, said holding means are substantially centered on said walls.

5. The invention as defined in claim 1, wherein one of said input and output conduit means has female threads on its end remote from said filter means and the other conduit means has on its end remote from said filter means male threads thereon.

6. The invention as defined in claim 1, wherein said container additionally comprises a storage compartment.

7. The invention as defined in claim 1, wherein said filter means comprises activated charcoal.

8. A portable water filter comprising:
   a base member;
   a plurality of vertical side wall members fixedly attached to said base member and perpendicular thereto forming an open ended container therewith;
   a removable cover member covering the open end of said container and providing a support member when installed in a second position within said container perpendicular to said base member;
   water filter means mounted to the inner surface of said cover member wherein said filter means is in a stored position when said cover is in its first position and is operable when said cover member is in its second position;
   means for securing said cover member to said container when in said second position; and
   input and output conduit means for delivering unfiltered water to said filter means and removing filtered water therefrom.

* * * * *